(12) United States Patent
Xue et al.

(10) Patent No.: US 10,085,203 B2
(45) Date of Patent: Sep. 25, 2018

(54) SIGNAL SENDING METHOD, SIGNAL DETECTION METHOD, RELATED APPARATUS, AND SYSTEM FOR IDENTIFYING DORMANT AND ACTIVE STATES OF A CELL

(71) Applicant: Huawei Technologies Co., Ltd., Shenzhen (CN)

(72) Inventors: Lixia Xue, Beijing (CN); David Jean-Marie Mazzarese, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 15/195,610

(22) Filed: Jun. 28, 2016

(65) Prior Publication Data
US 2016/0309398 A1 Oct. 20, 2016

Related U.S. Application Data

(63) Continuation of application No. PCT/CN2013/090798, filed on Dec. 28, 2013.

(51) Int. Cl.
*H04W 52/02* (2009.01)
*H04W 48/14* (2009.01)
(Continued)

(52) U.S. Cl.
CPC .......... *H04W 48/14* (2013.01); *H04L 5/0048* (2013.01); *H04W 52/0206* (2013.01);
(Continued)

(58) Field of Classification Search
CPC .. Y02B 60/50; H04W 52/0206; H04W 48/12; H04W 72/005; H04W 88/08;
(Continued)

(56) References Cited

U.S. PATENT DOCUMENTS

2010/0034163 A1* 2/2010 Damnjanovic ... H04W 72/0453
370/329
2013/0189932 A1 7/2013 Shen et al.
(Continued)

FOREIGN PATENT DOCUMENTS

CN 102421172 A 4/2012
CN 102685862 A 9/2012
(Continued)

OTHER PUBLICATIONS

"Small cell discovery," 3GPP TSG-RAN WG1 #74, Barcelona, Spain, R1-133592, pp. 1-4, 3$^{rd}$ Generation Partnership Project, Valbonne, France (Aug. 19-23, 2013).
(Continued)

*Primary Examiner* — Allahyar Kasraian
(74) *Attorney, Agent, or Firm* — Leydig, Voit & Mayer, Ltd.

(57) ABSTRACT

Embodiments of the present disclosure provide a method, where the method includes: when determining that a first cell enters or prepares to enter a dormant state, sending, by a base station, a first signal to a user equipment (UE) in the first cell, where the first signal carries information about time when the first cell enters the dormant state, for determining, according to the information about the time, that the first cell enters the dormant state; and when determining that the first cell enters an active state from the dormant state, sending, by the base station, a second signal to the user equipment in the first cell, for determining, according to the second signal, that the first cell enters the active state. By using technical solutions provided in the present disclosure, the UE can discover a state change of a cell in time.

20 Claims, 4 Drawing Sheets

---

101

When determining that a first cell enters or prepares to enter a dormant state, a base station sends a first signal to UE in the first cell

102

When determining that the first cell enters an active state from the dormant state, the base station sends a second signal to the UE in the first cell

(51) Int. Cl.
  *H04W 68/00* (2009.01)
  *H04L 5/00* (2006.01)
  *H04W 76/28* (2018.01)

(52) U.S. Cl.
  CPC ............ *H04W 68/00* (2013.01); *H04W 76/28* (2018.02); *Y02D 70/1262* (2018.01); *Y02D 70/25* (2018.01)

(58) Field of Classification Search
  CPC ............ H04W 68/00; H04W 52/0212; H04W 52/0248; H04W 48/08; H04W 48/10; H04W 52/00; H04W 52/0258; H04W 52/028; H04W 52/0235
  USPC .................................................. 455/507, 522
  See application file for complete search history.

(56) References Cited

U.S. PATENT DOCUMENTS

2013/0281076 A1   10/2013   Damnjanovic et al.
2015/0305024 A1*  10/2015   Rosa ..................... H04W 56/00
                                                 370/329
2016/0066255 A1*  3/2016    Marinier ............... H04W 48/16
                                                 370/350

FOREIGN PATENT DOCUMENTS

CN         102821445 A      12/2012
WO      WO 2013174771 A1    11/2013

OTHER PUBLICATIONS

"Design target for discovery enhancement," 3GPP TSG RAN WG1 Meeting #75, San Francisco, California, R1-135381, 3$^{rd}$ Generation Partnership Project, Valbonne, France (Nov. 11-15, 2013).
"Way Forward on Downlink DTX," ST—Ericsson, Barcelona, Spain, R1-133970, Ag 7.2.1.1., Ericsson (Aug. 19-23, 2013).
"3rd Generation Partnership Project; Technical Specification Group Radio Access Network; Small cell enhancements or E-UTRA and E-UTRAN—Physical layer aspects (Release 12)," 3GPP TR 36.872, V12.1.0, XP51293229, pp. 1-100, 3rd Generation Partnership Project, Valbonne, France (Dec. 2013).

* cited by examiner

SIGNAL SENDING METHOD, SIGNAL DETECTION METHOD, RELATED APPARATUS, AND SYSTEM FOR IDENTIFYING DORMANT AND ACTIVE STATES OF A CELL

CROSS-REFERENCE TO RELATED APPLICATION

This application is a continuation of International Application No. PCT/CN2013/090798, filed on Dec. 28, 2013, which is hereby incorporated by reference in its entirety.

TECHNICAL FIELD

Embodiments of the present disclosure relate to the communications field, and in particular, to a signal sending method, a signal detection method, a related apparatus, and a system.

BACKGROUND

In a current Long Term Evolution (LTE) system (such as Releases 8-11), user equipment (UE) synchronizes with a base station by detecting a primary synchronization signal (PSS) and a secondary synchronization signal (SSS) that are sent by the base station, identifies a physical cell served by the base station, and then reads a system broadcast message sent by the base station, initiates random access to the base station, and may finally establish a radio resource control (RRC) connection with the base station, and perform data communication with the base station. The foregoing synchronization is further classified into initial coarse synchronization and time-frequency tracking and fine synchronization, where the initial coarse synchronization is completed according to the PSS and the SSS that are sent by the base station, and the time-frequency tracking and fine synchronization is completed by using a cell-specific reference signal (CRS) sent by the base station. To perform data communication with the base station, the UE in the RRC connection state needs to perform necessary measurement and synchronization tracking. For example, the UE needs to measure channel state information (CSI) by using the CRS or a channel state information-reference signal (CSI-RS), and report the CSI to the base station, so that the base station selects a proper modulation and coding scheme according to the CSI measured by the UE, so as to perform data scheduling for the UE. The UE performs synchronization tracking by using the CRS to ensure demodulation performance of data, and the UE further needs to implement radio resource management by using the CRS.

To ensure the foregoing measurement and synchronization requirements, in the current LTE system, sending periods of the PSS and the SSS are both five milliseconds (ms), and two orthogonal frequency division multiplexing (OFDM) symbols of six central resource blocks in a carrier are occupied each time the PSS or the SSS is sent. The CRS needs to be sent in each subframe, and generally occupies two or four resource units in two OFDM symbols of one resource block. Specially, for a subsequent evolved LTE system, a non-backward compatible carrier or a non-backward compatible transmission and use manner is introduced, and the sending period of the CRS needs to be kept at 5 ms at least. In addition, although the UE in an RRC idle state does not need to perform CSI measurement, the UE also needs to perform necessary radio resource management (RRM) measurement, so that the UE selects a cell or reselects a cell according to the RRM to meet a mobility requirement.

It can be learned from the above that, in the current LTE system, the base station needs to continually send signals with a relatively short period, such as the PSS, the SSS, and the CRS. However, in a coverage area of a cell, when a quantity of UEs is small or a quantity of UEs that have services to transmit is small or there is no UE, continually sending the signals with a relatively short period such as the PSS, the SSS, and the CRS in the cell greatly reduces power efficiency of the cell. In addition, sending of the signals with a relatively short period such as the PSS, the SSS, and the CRS causes severe interference between cells and increases load of signal transmission, which further reduces performance and a transmission capacity that are of a system.

Based on the foregoing situations, two mechanisms are currently introduced: one is a cell dynamic discontinuous transmission mechanism, that is, as long as no fixed signal needs to be sent in a current subframe, no signal transmission is performed or signal transmission is reduced in the cell in the current subframe; the other is a semi-static cell dormancy mechanism, that is, it is determined, according to situations such as load and a transmission amount of a service in a cell, and whether there is UE that is served in the cell, that within a period of time, no signal transmission is performed or signal transmission is reduced. For both the cell dynamic discontinuous transmission mechanism and the semi-static cell dormancy mechanism, a nature is that no signal transmission is performed or signal transmission is reduced. Herein, a state in which no signal transmission is performed or signal transmission is reduced is uniformly referred to as a dormant state, and a state corresponding to the dormant state (that is, a state in which UE is properly served) is referred to as an active state. The foregoing two mechanisms have the following disadvantages:

It is assumed that a cell in the dormant state can be triggered to shut down only by a current service, and can still sense whether a new service of UE arrives and is transmitted in a coverage area of the cell. In a case in which a dynamic service arrives in the cell, or UE enters the cell, or the like, transmission of the new service cannot be immediately started in the cell. Because it is possible that the UE is still unaware of a network state change, an interworking constraint needs to be established between the cell and the UE (that is, enabling the UE to be aware of the active state of the cell). In this process, a state change transition between the dormant state and the active state and a transition delay may exist, and the delay may consume dozens of, hundreds of, and even thousands of subframes. Therefore, service transmission cannot be immediately started in the cell in the dormant state upon a service arrival, which inevitably causes a transmission delay, thereby deteriorating system performance, and reducing service efficiency.

SUMMARY

Embodiments of the present disclosure provide a signal sending method, a signal detection method, a relevant apparatus, and a system, which are used to enable UE to discover a state change of a cell in time.

To resolve the foregoing technical problem, the following technical solutions are provided:

A first aspect of the present disclosure provides a signal sending method, including:

when determining that a first cell enters or prepares to enter a dormant state, sending, by a base station, a first signal to user equipment in the first cell, where the first signal carries information about time when the first cell enters the dormant state, so that the user equipment determines, according to the information about the time, that the first cell enters the dormant state; and when determining that the first cell enters an active state from the dormant state, sending, by the base station, a second signal to the user equipment in the first cell, so that the user equipment determines, according to the second signal, that the first cell enters the active state, where the second signal is any one or a combination of any two or more of the following signals:

a primary synchronization signal PSS, a secondary synchronization signal SSS, a cell-specific reference signal CRS, and a channel state information-reference signal CSI-RS.

Based on the first aspect of the present disclosure, in a first possible implementation manner, the sending a first signal to user equipment in the first cell, where the first signal carries information about time when the first cell enters the dormant state includes:

sending the first signal to the user equipment in the first cell, where the first signal carries a start time point at which the first cell enters the dormant state, so that the user equipment determines, according to the start time point at which the first cell enters the dormant state, that the first cell enters the dormant state from the start time point.

Based on the first aspect of the present disclosure, in a second possible implementation manner, the sending a first signal to user equipment in the first cell, where the first signal carries information about time when the first cell enters the dormant state includes:

sending the first signal to the user equipment in the first cell, where the first signal carries at least one time period in which the first cell enters the dormant state, so that the user equipment determines, according to the at least one time period in which the first cell enters the dormant state, that the first cell is in the dormant state within the at least one time period.

Based on the first aspect of the present disclosure, or the first possible implementation manner of the first aspect of the present disclosure, or the second possible implementation manner of the first aspect of the present disclosure, in a third possible implementation manner, the sending a first signal to user equipment in the first cell includes:

sending a discovery signal to the user equipment in the first cell according to a preset sending manner of the discovery signal, where the sending manner of the discovery signal includes one or two of a time-frequency resource location and a sending period that are of the discovery signal.

Based on the first aspect of the present disclosure, or the first possible implementation manner of the first aspect of the present disclosure, or the second possible implementation manner of the first aspect of the present disclosure, or the third possible implementation manner of the first aspect of the present disclosure, in a fourth possible implementation manner, the sending a second signal to the user equipment in the first cell includes:

sending the second signal to the user equipment in the first cell according to a preset sending manner of the second signal, where the sending manner of the second signal includes one or two of a time-frequency resource location and a sending period that are of the second signal.

Based on the first aspect of the present disclosure, or the first possible implementation manner of the first aspect of the present disclosure, or the second possible implementation manner of the first aspect of the present disclosure, or the third possible implementation manner of the first aspect of the present disclosure, or the fourth possible implementation manner of the first aspect of the present disclosure, in a fifth possible implementation manner, the first signal is different from the second signal, and a difference includes any one or a combination of any two or more of the following differences:

a difference between a signal type of the first signal and a signal type of the second signal;

a difference between a channel that carries the first signal and a channel that carries the second signal;

a difference between a time-frequency resource location of the first signal and the time-frequency resource location of the second signal; and a difference between a sending period of the first signal and the sending period of the second signal.

A second aspect of the present disclosure provides a signal detection method, including:

receiving, by user equipment, a first signal, where the first signal carries information about time when the first cell enters a dormant state;

determining, by the user equipment according to the information about the time, that the first cell enters the dormant state;

detecting, by the user equipment, a second signal; and when the second signal is detected, determining, by the user equipment according to the second signal, that the first cell enters an active state, where the second signal is any one or a combination of any two or more of the following signals:

a primary synchronization signal PSS, a secondary synchronization signal SSS, a cell-specific reference signal CRS, and a channel state information-reference signal CSI-RS.

Based on the second aspect of the present disclosure, in a first possible implementation manner, the first signal carries a start time point at which the first cell enters the dormant state; and the determining, by the user equipment according to the first signal, that the first cell enters the dormant state includes:

determining, by the user equipment according to the start time point at which the first cell enters the dormant state, that the first cell enters the dormant state from the start time point.

Based on the second aspect of the present disclosure, in a second possible implementation manner, the first signal carries at least one time period in which the first cell enters the dormant state; and the determining, by the user equipment according to the first signal, that the first cell enters the dormant state includes:

determining, by the user equipment according to the at least one time period in which the first cell enters the dormant state, that the first cell is in the dormant state within the at least one time period.

Based on the second aspect of the present disclosure, or the first possible implementation manner of the second aspect of the present disclosure, or the second possible implementation manner of the second aspect of the present disclosure, in a third possible implementation manner, the receiving, by user equipment, a first signal is specifically:

receiving a discovery signal; and the determining, by the user equipment according to the first signal, that the first cell enters the dormant state includes:

determining, by the user equipment according to a sending manner of the received discovery signal, that the first cell enters the active state, where the sending manner of the discovery signal includes one or two of a time-frequency resource location and a sending period that are of the discovery signal.

Based on the second aspect of the present disclosure, or the first possible implementation manner of the second aspect of the present disclosure, or the second possible implementation manner of the second aspect of the present disclosure, or the third possible implementation manner of the second aspect of the present disclosure, in a fourth possible implementation manner, the determining, by the user equipment according to the second signal, that the first cell enters an active state from the dormant state includes:

detecting a sending manner of the second signal; and determining, by the user equipment according to the sending manner of the second signal, that the first cell enters the active state, where the sending manner of the second signal includes one or two of a time-frequency resource location and a sending period that are of the second signal.

Based on the second aspect of the present disclosure, or the first possible implementation manner of the second aspect of the present disclosure, or the second possible implementation manner of the second aspect of the present disclosure, or the third possible implementation manner of the second aspect of the present disclosure, or the fourth possible implementation manner of the second aspect of the present disclosure, in a fifth possible implementation manner, the method further includes:

if determining that the first cell enters the active state, starting, by the user equipment, to detect a control channel in the first cell, or to receive or send service data in the first cell.

Based on the second aspect of the present disclosure, or the first possible implementation manner of the second aspect of the present disclosure, or the second possible implementation manner of the second aspect of the present disclosure, or the third possible implementation manner of the second aspect of the present disclosure, or the fourth possible implementation manner of the second aspect of the present disclosure, in a sixth possible implementation manner, the method further includes:

if determining that the first cell enters the dormant state, stopping, by the user equipment, receiving or sending service data in the first cell.

Based on the second aspect of the present disclosure, or the first possible implementation manner of the second aspect of the present disclosure, or the second possible implementation manner of the second aspect of the present disclosure, or the third possible implementation manner of the second aspect of the present disclosure, or the fourth possible implementation manner of the second aspect of the present disclosure, or the fifth possible implementation manner of the second aspect of the present disclosure, or the sixth possible implementation manner of the second aspect of the present disclosure, in a seventh possible implementation manner, the first signal is different from the second signal, and a difference includes any one or a combination of any two or more of the following differences:

a difference between a signal type of the first signal and a signal type of the second signal;

a difference between a channel that carries the first signal and a channel that carries the second signal;

a difference between a time-frequency resource location of the first signal and the time-frequency resource location of the second signal; and a difference between a sending period of the first signal and the sending period of the second signal.

A third aspect of the present disclosure provides a base station, including:

a first determining unit, configured to determine that a first cell enters or prepares to enter a dormant state;

a sending unit, configured to: when the first determining unit determines that the first cell enters or prepares to enter the dormant state, send a first signal to user equipment in the first cell, where the first signal carries information about time when the first cell enters the dormant state; and a second determining unit, configured to determine that the first cell enters an active state from the dormant state; where the sending unit is further configured to: when the second determining unit determines that the first cell enters the active state from the dormant state, send a second signal to the user equipment in the first cell, so that the user equipment determines, according to the second signal, that the first cell enters the active state, where the second signal is any one or a combination of any two or more of the following signals:

a primary synchronization signal PSS, a secondary synchronization signal SSS, a cell-specific reference signal CRS, and a channel state information-reference signal CSI-RS.

Based on the third aspect of the present disclosure, in a first possible implementation manner, the sending unit is further configured to include, into the first signal, a start time point at which the first cell enters the dormant state, so that the user equipment determines, according to the start time point at which the first cell enters the dormant state, that the first cell enters the dormant state from the start time point.

Based on the third aspect of the present disclosure, in a second possible implementation manner, the sending unit is further configured to include, into the first signal, at least one time period in which the first cell enters the dormant state, so that the user equipment determines, according to the at least one time period in which the first cell enters the dormant state, that the first cell is in the dormant state within the at least one time period.

Based on the third aspect of the present disclosure, or the first possible implementation manner of the third aspect of the present disclosure, or the second possible implementation manner of the third aspect of the present disclosure, in a third possible implementation manner, the sending unit is specifically configured to send the first signal to the user equipment in the first cell in the following manner: sending a discovery signal to the user equipment in the first cell according to a preset sending manner of the discovery signal, where the sending manner of the discovery signal includes one or two of a time-frequency resource location and a sending period that are of the discovery signal.

Based on the third aspect of the present disclosure, or the first possible implementation manner of the third aspect of the present disclosure, or the second possible implementation manner of the third aspect of the present disclosure, in a fourth possible implementation manner, the sending unit is specifically configured to send the second signal to the user equipment in the first cell according to a preset sending manner of the second signal, where the sending manner of the second signal includes one or two of a time-frequency resource location and a sending period that are of the second signal.

A fourth aspect of the present disclosure provides user equipment, including:

a receiving unit, configured to receive a first signal, where the first signal carries information about time when the first cell enters a dormant state;

a first determining unit, configured to: when the receiving unit receives the first signal, determine, according to the information about the time, that the first cell enters the dormant state;

a first detection unit, configured to detect a second signal; and a second determining unit, configured to: when the first detection unit detects the second signal, determine, according to the second signal, that the first cell enters an active state from the dormant state, where the second signal is any one or a combination of any two or more of the following signals:

a primary synchronization signal PSS, a secondary synchronization signal SSS, a cell-specific reference signal CRS, and a channel state information-reference signal CSI-RS.

Based on the fourth aspect of the present disclosure, in a first possible implementation manner, the first signal carries a start time point at which the first cell enters the dormant state; and the first determining unit is further configured to determine, according to the start time point at which the first cell enters the dormant state, that the first cell enters the dormant state from the start time point.

Based on the fourth aspect of the present disclosure, in a second possible implementation manner, the first signal carries at least one time period in which the first cell enters the dormant state; and the first determining unit is further configured to determine, according to the at least one time period in which the first cell enters the dormant state, that the first cell is in the dormant state within the at least one time period.

Based on the fourth aspect of the present disclosure, or the first possible implementation manner of the fourth aspect of the present disclosure, or the second possible implementation manner of the fourth aspect of the present disclosure, in a third possible implementation manner, the first signal received by the receiving unit is a discovery signal; and the first determining unit is specifically configured to determine, according to a sending manner of the received discovery signal, that the first cell enters the active state, where the sending manner of the discovery signal includes one or two of a time-frequency resource location and a sending period that are of the discovery signal.

Based on the fourth aspect of the present disclosure, or the first possible implementation manner of the fourth aspect of the present disclosure, or the second possible implementation manner of the fourth aspect of the present disclosure, or the third possible implementation manner of the fourth aspect of the present disclosure, in a fourth possible implementation manner, the user equipment further includes:

a second detection unit, configured to: when the first detection unit detects the second signal, detect a sending manner of the second signal; and the second determining unit is specifically configured to determine, according to the sending manner that is of the second signal and detected by the second detection unit, that the first cell enters the active state, where the sending manner of the second signal includes one or two of a time-frequency resource location and a sending period that are of the second signal.

Based on the fourth aspect of the present disclosure, or the first possible implementation manner of the fourth aspect of the present disclosure, or the second possible implementation manner of the fourth aspect of the present disclosure, or the third possible implementation manner of the fourth aspect of the present disclosure, or the fourth possible implementation manner of the fourth aspect of the present disclosure, in a fifth possible implementation manner, the user equipment further includes:

a first service control unit, configured to: when the second determining unit determines that the first cell enters the active state from the dormant state, start to detect and receive service data in the first cell.

Based on the fourth aspect of the present disclosure, or the first possible implementation manner of the fourth aspect of the present disclosure, or the second possible implementation manner of the fourth aspect of the present disclosure, or the third possible implementation manner of the fourth aspect of the present disclosure, or the fourth possible implementation manner of the fourth aspect of the present disclosure, in a sixth possible implementation manner, the user equipment further includes:

a second service control unit, configured to: when the first determining unit determines that the first cell enters the dormant state, stop detecting and receiving service data in the first cell.

A fifth aspect of the present disclosure provides a base station, including a transceiving apparatus and a processor; where the processor is configured to: when the base station determines that a first cell enters or prepares to enter a dormant state, control the transceiving apparatus to send a first signal to user equipment in the first cell, where the first signal carries information about time when the first cell enters the dormant state, so that the user equipment determines, according to the information about the time, that the first cell enters the dormant state, and when the first cell enters an active state from the dormant state, control the transceiving apparatus to send a second signal to the user equipment in the first cell, so that the user equipment determines, according to the second signal, that the first cell enters the active state, where the second signal is any one or a combination of any two or more of the following signals:

a primary synchronization signal PSS, a secondary synchronization signal SSS, a cell-specific reference signal CRS, and a channel state information-reference signal CSI-RS.

Based on the fifth aspect of the present disclosure, in a first possible implementation manner, the processor is specifically configured to send the first signal to the user equipment in the first cell, where the first signal carries a start time point at which the first cell enters the dormant state, so that the user equipment determines, according to the start time point at which the first cell enters the dormant state, that the first cell enters the dormant state from the start time point.

Based on the fifth aspect of the present disclosure, in a second possible implementation manner, the processor is specifically configured to send the first signal to the user equipment in the first cell, where the first signal carries at least one time period in which the first cell enters the dormant state, so that the user equipment determines, according to the at least one time period in which the first cell enters the dormant state, that the first cell is in the dormant state within the at least one time period.

Based on the fifth aspect of the present disclosure, or the first possible implementation manner of the fifth aspect of the present disclosure, or the second possible implementation manner of the fifth aspect of the present disclosure, in a third possible implementation manner, the processor is specifically configured to send the first signal to the user equipment in the first cell in the following manner: sending a discovery signal to the user equipment in the first cell according to a preset sending manner of the discovery signal, where the sending manner of the discovery signal includes one or two of a time-frequency resource location and a sending period that are of the discovery signal.

Based on the fifth aspect of the present disclosure, or the first possible implementation manner of the fifth aspect of the present disclosure, or the second possible implementation manner of the fifth aspect of the present disclosure, or the third possible implementation manner of the fifth aspect of the present disclosure, in a fourth possible implementation manner, the processor is specifically configured to send the second signal to the user equipment in the first cell in the following manner: sending the second signal to the user equipment in the first cell according to a preset sending manner of the second signal, where the sending manner of the second signal includes one or two of a time-frequency resource location and a sending period that are of the second signal.

A sixth aspect of the present disclosure provides user equipment, including a transceiving apparatus and a processor; where the transceiving apparatus is configured to receive a first signal, where the first signal carries information about time when the first cell enters a dormant state; and the processor is configured to: determine, according to the information about the time, that the first cell enters the dormant state, and detect a second signal; and when the second signal is detected, determine, according to the second signal, that the first cell enters an active state from the dormant state, where the second signal is any one or a combination of any two or more of the following signals:

a primary synchronization signal PSS, a secondary synchronization signal SSS, a cell-specific reference signal CRS, and a channel state information-reference signal CSI-RS.

Based on the sixth aspect of the present disclosure, in a first possible implementation manner, the first signal carries a start time point at which the first cell enters the dormant state; and the processor is further configured to determine, according to the start time point at which the first cell enters the dormant state, that the first cell enters the dormant state from the start time point.

Based on the sixth aspect of the present disclosure, in a second possible implementation manner, the first signal carries at least one time period in which the first cell enters the dormant state; and the processor is further configured to determine, according to the at least one time period in which the first cell enters the dormant state, that the first cell is in the dormant state within the at least one time period.

Based on the sixth aspect of the present disclosure, or the first possible implementation manner of the sixth aspect of the present disclosure, or the second possible implementation manner of the sixth aspect of the present disclosure, in a third possible implementation manner, the first signal received by the transceiving apparatus is a discovery signal; and the processor is specifically configured to determine, according to a sending manner of the discovery signal received by the transceiving apparatus, that the first cell enters the active state, where the sending manner of the discovery signal includes one or two of a time-frequency resource location and a sending period that are of the discovery signal.

Based on the sixth aspect of the present disclosure, or the first possible implementation manner of the sixth aspect of the present disclosure, or the second possible implementation manner of the sixth aspect of the present disclosure, or the third possible implementation manner of the sixth aspect of the present disclosure, in a fourth possible implementation manner, the processor is specifically configured to: acquire a sending manner of the second signal, and determine, according to the sending manner of the second signal, that the first cell enters the active state, where the sending manner of the second signal includes one or two of a time-frequency resource location and a sending period that are of the second signal.

Based on the sixth aspect of the present disclosure, or the first possible implementation manner of the sixth aspect of the present disclosure, or the second possible implementation manner of the sixth aspect of the present disclosure, or the third possible implementation manner of the sixth aspect of the present disclosure, or the fourth possible implementation manner of the sixth aspect of the present disclosure, in a fifth possible implementation manner, the processor is further configured to: when determining that the first cell enters the active state, start to detect and receive service data in the first cell.

Based on the sixth aspect of the present disclosure, or the first possible implementation manner of the sixth aspect of the present disclosure, or the second possible implementation manner of the sixth aspect of the present disclosure, or the third possible implementation manner of the sixth aspect of the present disclosure, or the fourth possible implementation manner of the sixth aspect of the present disclosure, in a sixth possible implementation manner, the processor is further configured to: when determining that the first cell enters the dormant state, stop detecting and receiving service data in the first cell.

A seventh aspect of the present disclosure provides a communications system, including any base station according to the third aspect and the fifth aspect, and any user equipment according to the fourth aspect and the sixth aspect.

It can be learned from the foregoing technical solutions that in the embodiments of the present disclosure, a first signal is used to indicate, to UE, that a first cell enters a dormant state, and a second signal is used to indicate, to the UE, that the first cell enters an active state from the dormant state, so that the UE can discover a state change of the first cell in time, and therefore, it is possible that the UE executes a corresponding processing mechanism in time with respect to the state change of the first cell, which is advantageous for improving system performance and service efficiency of the cell.

DESCRIPTION OF EMBODIMENTS

Figure 1:
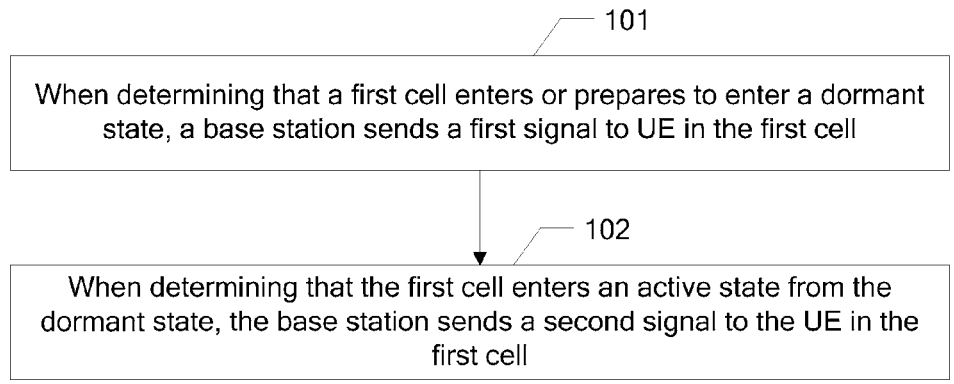
FIG. 1 is a schematic flowchart of an embodiment of a signal sending method according to the present disclosure.

Embodiments of the present disclosure provide a signal sending method, a signal detection method, a relevant apparatus, and a system.

To make the disclosure objectives, features, and advantages of the present disclosure clearer and more comprehensible, the following clearly and completely describes the technical solutions in the embodiments of the present disclosure with reference to the accompanying drawings in the embodiments of the present disclosure. Apparently, the embodiments described are merely some but not all of the embodiments of the present disclosure. All other embodiments obtained by a person of ordinary skill in the art based on the embodiments of the present disclosure without creative efforts shall fall within the protection scope of the present disclosure.

Two cell states (that is, a dormant state and an active state) mentioned in the embodiments of the present disclosure are described first. When a cell is in the dormant state, no signal transmission is performed or signal transmission is reduced in the cell. When a cell is in the active state, the cell properly serves UE, that is, signal transmission is not shielded or reduced. A mechanism of the dormant state of the cell in the embodiments of the present disclosure includes two manners:

The first manner is a dynamic discontinuous transmission method for a cell, which may also be referred to as dynamic cell dormancy. That is, as long as no signal needs to be regularly sent in a current subframe, it may be dynamically implemented in the cell that data and relevant control information of any UE are not scheduled, and therefore, no signal is transmitted in the current subframe in the cell. The signal regularly mainly includes any one or a combination of any two or more of the following signals: for example, a PSS, an SSS, a CRS, a broadcast signal, and a paging signal that are pre-defined to be sent in the cell, or transmission signals previously configured in the cell, which include a CSI-RS, a discovery reference signal (DRS), a positioning reference signal (PRS), and the like. In this manner, discontinuous transmission in the cell is enabled as much as possible by reducing regular sending of the signal. Signals such as the CSI-RS are mainly determined by cell configurations, and transmission of the signals can be flexibly reduced. However, for signals such as the above-mentioned PSS, SSS, and CRS, theses signals are signals that support processes such as cell synchronization, cell discovery, and measurement that are of UE, and therefore, reduction of these signals is restricted. Potentially, for a non-backward compatible transmission and use manner of new UE, a sending period of CRS transmission may be reduced to 5 ms at least. In this way, the CRS may be transmitted, together with the PSS and the SSS, in one or more subframes, and the CRS may not be transmitted in other subframes. Then, whether to dynamically enable the dormant state may be determined in these subframes in the cell according to a transmission situation of another signal and service.

The second manner is a semi-static cell dormancy method, that is, a mechanism in which a cell determines, according to situations such as load and a transmission amount of a service in the cell, and whether there is UE that needs to be served in a coverage area of the cell, that transmission is not performed within a period of time. Within this period of time, no signal transmission is performed or signal transmission is reduced in the cell. Signals that are not transmitted as described above include the PSS, the SSS, and the CRS, and include signals carried by a control channel, a data channel, or the like. In this way, the cell can be completely shut down. The foregoing reduction of signal transmission means that only a small quantity of necessary signals are transmitted, for example, a DRS that mainly supports discovery and/or perform radio resource management (RRM) measurement performed by UE on the cell.

Further, for the foregoing two mechanisms of the dynamic discontinuous transmission mechanism and the semi-static cell dormancy mechanism, in one manner, the dynamic discontinuous transmission mechanism or the semi-static cell dormancy mechanism is separately enabled and specifically used according to time-division configurations of the cell, where the two mechanisms are time-division multiplexed; in another manner, a selection method may be used. For example, the dynamic discontinuous transmission mechanism may be used by default in the cell, and at the same time, the semi-static cell dormancy mechanism is enabled, but the semi-static cell dormancy mechanism has a higher priority. That is, when the UE receives signaling or indication information of the semi-static cell dormancy mechanism, the UE assumes that the semi-static dormancy mechanism is enabled in the cell. Within a time period in which the cell enters the dormant state and that is indicated by the foregoing dormancy mechanism, no signal transmission is performed or signal transmission is reduced (for example, only the DRS is transmitted) in the cell. In this way, signal transmission is reduced in the cell as much as possible, interference between cells and power consumption that are caused by unnecessary signal transmission are reduced, and transmission efficiency and system performance are improved.

The embodiments of the present disclosure provide a solution that optimizes and shortens a state change transition between the dormant state and the active state and a transition delay, so that service transmission can be started immediately upon a service arrival, which reduces a service transmission delay, and improves system performance and user experience.

The following describes the signal sending method in the present disclosure by using an embodiment, and this embodiment of the present disclosure is mainly described by using a base station as an execution body. Referring to FIG. 1, the signal sending method in this embodiment of the present disclosure includes:

101. When determining that a first cell enters or prepares to enter a dormant state, a base station sends a first signal to UE in the first cell.

The first signal carries information about time when the first cell enters the dormant state, so that the UE determines, according to the information about the time, that the first cell enters the dormant state.

If the first cell is in the dormant state, a base station to which the first cell belongs sends no signal or for some signals (for example, a DRS), sends as few signals as possible in the first cell. To avoid impact on the UE that is caused because no transmission is preformed or transmission of some signals (for example, a PSS, an SSS, and a CRS) is reduced in the first cell in the dormant state, when the first cell enters or prepares to enter the dormant state, the base station sends the first signal to the UE, so that the UE learns, by detecting the first signal, that the first cell enters the dormant state, and after learning that the first cell enters the dormant state, the UE executes a corresponding processing mechanism, for example, stopping receiving and detecting a control channel PDCCH/EPDCCH in the first cell, and/or stopping receiving service data in the first cell.

In an implementation manner, when the first cell determines to enter or prepare to enter the dormant state, the base station sends the first signal to the UE, where the first signal carries a start time point at which the first cell enters the dormant state, or by means of a protocol agreement, the UE considers that the first cell starts to enter the dormant state when the UE detects the first signal, thereby notifying the UE that the first cell starts to enter the dormant state at specific time. Then, the UE stops, within this period of time, receiving and detecting the control channel PDCCH/EPDCCH in the first cell, and/or stops receiving the service data in the first cell, and detects, receives, and measures, in a restricted manner, a signal that is possibly transmitted, for example, a DRS, or a signal that represents the active state. Such a manner flexibly supports entry to the dormant state at any time.

In another implementation manner, at least one parameter of a time period of the dormant state is defined. The base station sends the first signal to the UE when the first cell determines to enter or prepare to enter the dormant state, where the first signal carries at least one time period in which the first cell enters the dormant state, thereby notifying the UE that the dormant state of the first cell specifically starts from specific time and ends at specific time. The parameter of the time period may specifically indicate a situation of one period of the dormant state, a situation in which the dormant state occurs periodically for multiple times, or the like, which is not limited herein.

It should be noted that, the present disclosure is not limited to the foregoing two manners for notifying the UE that the first cell enters the dormant state, for example, pre-defined configuration may be performed for sending of the first signal in this embodiment of the present disclosure. For example, a function of transmitting the first signal within a period of time may be enabled to implicitly indicate that the first cell enters the dormant state within this period of time. When the UE detects the first signal within the period of time, it is indicated that the first cell is in the dormant state within the period of time.

Optionally, the first signal is a discovery signal, for example, the DRS. In this embodiment of the present disclosure, the UE may learn, by detecting the first signal, that the cell in which the first signal is sent to the UE enters the dormant state; in addition, the discovery signal may further be used to support cell synchronization, cell discovery, and RRM measurement that are of the UE, where the discovery signal includes but is not limited to any one or a combination of two or more of the following signals: a PSS, an SSS, a CRS, a CSI-RS, a PRS, and the like. When the first cell enters the dormant state, the base station sends the discovery signal to the UE in the first cell according to a preset sending manner of the discovery signal, where the sending manner of the discovery signal includes one or two of a time-frequency resource location and a sending period that are of the discovery signal. Optionally, the sending manner of the discovery signal may be pre-defined by a system or configured by means of configuration signaling, which is not limited herein.

It should be noted that, for a situation in which the discovery signal is a combination of multiple signals, different functions may be implemented by using different signal parts, for example, cell synchronization and discovery are implemented by using the PSS and/or the SSS, RRM measurement is performed by using the CRS or the CSI-RS, and that the cell enters the dormant state is indicated by using other network auxiliary information or by using the sending manner of the discovery signal, including the period and the time-frequency resource location. Specifically, for example, distinguishing is made by using a period or a frequency domain location of the PSS and/or the SSS. When an existing cell is in a normal communication state (that is, the active state), the PSS/SSS is transmitted in six central data blocks in entire system bandwidth in a period of 5 ms. When the PSS/SSS is transmitted in a location different from the six central data blocks in the entire system bandwidth or in another period, it may be considered that the cell enters the dormant state.

Optionally, the UE acquires the first signal according to any channel of a physical broadcast channel (PBCH), or a physical control format indicator channel (PCFICH), or a physical downlink control channel (PDCCH) in common search space, or an Enhanced Physical Downlink Control Channel (EPDCCH), where these channels are sent by the base station.

Specifically, considering that entering the dormant state by the cell is a cell-specific behavior, in a situation in which the base station senses that there is no service transmission in the cell or no UE exists in the cell, the base station triggers, as soon as possible, the cell to enter the dormant state, so as to reduce as much interference between cells and power consumption that are caused by unnecessary signal transmission as possible. In this way, the first signal is preferably dynamic signaling sent in a cell-specific broadcast manner, for example, carried in a master information block (MIB) and sent in a manner of the PBCH, or carried in public cell-specific downlink control information (DCI) and transmitted in common search space (CSS) of the PDCCH or in enhanced common search space (ECSS) of the EPDCCH, or even carried in a control format indicator (CFI) and sent in a manner of the PCFICH. Further, state information of an existing redundant CFI may be used to specifically carry information about the cell entering the dormant state, and the like. Further, the first signal may also be dynamic signaling transmitted in a unicast manner, MAC layer dedicated signaling, or RRC dedicated signaling. Considering that old UEs potentially exist in the cell, the old UEs cannot support the dormant state of the cell; however, a handover, a carrier deactivation mechanism, and the like may be used to enable these old UEs to leave the cell, and enable these old UEs not to receive and detect a control channel or service data within at least a period of time. In addition, the manner may also be suitable for new UE (that is, UE that supports the dormant state of the cell). For example, when the cell enters the dormant state, an existing deactivation mechanism may still be used to notify the UE, so that the UE does not receive and detect the control channel or the service data within at least a period of time. In addition, the first signal may further be used to notify the UE that the cell enters the dormant state, so that the UE distinguishes the dormant state of the cell from an inactive state in the old mechanism. If an RRM measurement mechanism of the inactive state is different from that of the dormant state of the cell, in this case, the UE may execute a corresponding RRM measurement mechanism and the like according to a specific situation (for example, whether a current state is the inactive state of the current UE or the dormant state of the cell).

In conclusion, any method in which explicit signaling or implicit signaling is used to notify the UE that the cell enters the dormant state shall fall within the protection scope of the embodiments of the present disclosure. Specifically, the first signal may be sent to the UE in a dynamic manner, or a semi-static manner, or a unicast manner, or a manner of broadcast in a specific period, or is sent to the UE in an event-triggered manner, which is not limited herein.

102. When determining that the first cell enters an active state from the dormant state, the base station sends a second signal to the UE in the first cell, so that the UE determines, according to the second signal, that the first cell enters the active state.

The second signal is any one or a combination of any two or more of the following signals: a PSS, an SSS, a CRS, and a CSI-RS.

Further, the second signal may further include signals carried by channels such as a PCFICH, a PDCCH, and an EPDCCH, or MAC dedicated signaling, RRC dedicated signaling, or the like.

In this embodiment of the present disclosure, the UE is notified in an implicit indication manner that the first cell enters the active state from the dormant state (that is, the dormant state is terminated). That is, when the first cell determines to enter the active state from the dormant state, the base station sends the second signal to the UE, and as long as the UE detects the second signal, it is considered that the first cell has terminated the dormant state.

Optionally, when the first cell enters the active state from the dormant state, the base station sends the second signal to the UE in the first cell according to a preset sending manner of the second signal, where the sending manner of the second signal includes one or two of a time-frequency resource location and a sending period that are of the second signal.

It should be noted that, to use each signal in the foregoing several signals as the second signal or as a part of the second signal, a sending manner of the signal such as a time-frequency resource location and a sending period needs to be further determined, so as to be distinguished from a normally-sent signal. Specifically, the base station may flexibly configure the sending period of the second signal by combining a delay of a transition of the first cell from the dormant state to the active state. It should further be noted that, if the second signal is a combination of multiple signals, detection of the second signal is considered as successful only when the UE detects all signals included in the second signal. Optionally, the sending manner of the second signal may be pre-defined by a system or may be pre-configured by means of configuration signaling, which is not limited herein.

It should be noted that, the first signal is different from the second signal, and a difference includes any one or a combination of any two or more of the following differences: a difference between a signal type of the first signal and a signal type of the second signal, a difference between a channel that carries the first signal and a channel that carries the second signal, a difference between a time-frequency resource location of the first signal and the time-frequency resource location of the second signal, a difference between a sending period of the first signal and the sending period of the second signal, and a difference between sending power of the first signal and sending power of the second signal, which is not limited herein.

It can be learned from the foregoing technical solution that in this embodiment of the present disclosure, a first signal is used to indicate, to UE, that a first cell enters a dormant state, and a second signal is used to indicate, to the UE, that the first cell enters an active state from the dormant state, so that the UE can sense a state of the first cell in time, and therefore, it is possible that the UE executes a corresponding processing mechanism in time with respect to a change in the state of the first cell. For example, when learning that the first cell enters the active state from the dormant state, the UE starts to detect and receive a control channel of the first cell and/or service data of the first cell, so that service transmission can be correspondingly started immediately after the first cell enters the active state from the dormant state, which improves system performance and service efficiency of the cell.

Figure 2:
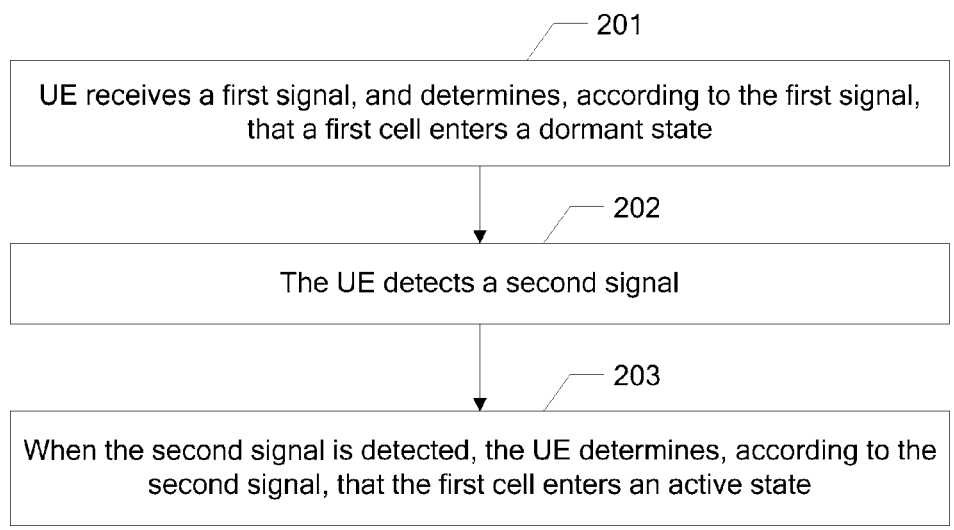
FIG. 2 is a schematic flowchart of an embodiment of a signal detection method according to the present disclosure.

The following describes the signal detection method in the present disclosure by using an embodiment, and this embodiment of the present disclosure is mainly described by using UE as an execution body. Referring to FIG. 2, the signal detection method in this embodiment of the present disclosure includes:

201. The UE receives a first signal, and determines, according to the first signal, that a first cell enters a dormant state.

In this embodiment of the present disclosure, the first signal carries information about time when the first cell enters the dormant state, so that the UE determines, according to the information about the time, that the first cell enters the dormant state.

In an implementation manner, when the first cell determines to enter the dormant state, the base station sends the first signal to the UE, where the first signal carries a start time point at which the first cell enters the dormant state, or by means of a protocol agreement, the UE considers that the first cell starts to enter the dormant state when the UE detects the first signal. The UE determines, according to the detected first signal, that the first cell enters the dormant state from the start time point. Then, the UE stops, within this period of time, receiving and detecting a control channel PDCCH/EPDCCH in the first cell, and/or stops receiving service data in the first cell, and detects, receives, and measures, in a restricted manner, a signal that is possibly transmitted, for example, a DRS, or a signal that represents an active state. Such a manner flexibly supports entry to the dormant state at any time.

In another implementation manner, at least one parameter of a time period of the dormant state is defined. The base station sends the first signal to the UE when the first cell determines to enter the dormant state, where the first signal carries at least one time period in which the first cell enters the dormant state, and the UE determines, according to the first signal, that the first cell is in the dormant state within the at least one time period. The parameter of the time period may specifically indicate a situation of one period of the dormant state, a situation in which the dormant state occurs periodically for multiple times, or the like, which is not limited herein.

Optionally, the first signal is a discovery signal, for example, the DRS. In this embodiment of the present disclosure, the UE may learn, by detecting the first signal, that the cell in which the first signal is sent to the UE enters the dormant state; in addition, the discovery signal may further be used to support cell synchronization, cell discovery, and RRM measurement that are of the UE, where the discovery signal includes but is not limited to any one or a combination of two or more of the following signals: a PSS, an SSS, a CRS, a CSI-RS, a PRS, and the like. When the first cell enters the dormant state, the base station sends the discovery signal to the UE in the first cell according to a preset sending manner of the discovery signal, where the sending manner of the discovery signal includes one or two of a time-frequency resource location and a sending period that are of the discovery signal. Optionally, the sending manner of the discovery signal may be pre-defined by a system or configured by means of configuration signaling, which is not limited herein.

It should be noted that, for a situation in which the discovery signal is a combination of multiple signals, different functions may be implemented by using different signal parts, for example, cell synchronization and discovery are implemented by using the PSS and/or the SSS, RRM measurement is performed by using the CRS or the CSI-RS, and that the cell enters the dormant state is indicated by using other network auxiliary information or by using the sending manner of the discovery signal, including the period and the time-frequency resource location. Specifically, for example, distinguishing is made by using a period or a frequency domain location of the PSS and/or the SSS. When an existing cell is in a normal communication state (that is, the active state), the PSS/SSS is transmitted in six central data blocks in entire system bandwidth in a period of 5 ms. When the UE detects that the PSS/SSS is transmitted in a location different from the six central data blocks in the entire system bandwidth or in another period (different from the period of 5 ms), it may be considered that the cell enters the dormant state.

Optionally, the UE acquires the first signal according to any channel of a PBCH, or a PCFICH, or a PDCCH, or an EPDCCH that is sent by the base station, or the first signal may be sent to the UE in a unicast manner or a manner of broadcast in a specific period, or is sent to the UE in an event-triggered manner; or the UE acquires the first signal according to the discovery signal, such as the DRS, and then determines that the first cell enters the dormant state, which is not limited herein.

Specifically, considering that entering the dormant state by the cell is a cell-specific behavior, in a situation in which the base station senses that there is no service transmission in the cell or no UE exists in the cell, the base station triggers, as soon as possible, the cell to enter the dormant state, so as to reduce as much interference between cells and power consumption that are caused by unnecessary signal transmission as possible. In this way, the first signal is preferably dynamic signaling sent in a cell-specific broadcast manner, for example, carried in an MIB and sent in a manner of the PBCH, or carried in public cell-specific DCI and transmitted in CSS of the PDCCH, or in ECSS of the EPDCCH, or even carried in a CFI and sent in a manner of the PCFICH. Further, state information of an existing redundant CFI may be used to specifically carry information about the cell entering the dormant state, and the like. In conclusion, any method in which explicit signaling or implicit signaling is used to notify the UE that the cell enters the dormant state shall fall within the protection scope of the embodiments of the present disclosure. Specifically, the first signal may be dynamic signaling, MAC layer dedicated signaling, or RRC dedicated signaling. Considering that old UEs potentially exist in the cell, the old UEs cannot support the dormant state of the cell; however, a handover, a carrier deactivation mechanism, and the like may be used to enable these old UEs to leave the cell, and enable these old UEs not to receive and detect a control channel or service data within at least a period of time. In addition, the manner may also be suitable for new UE (that is, UE that supports the dormant state of the cell). For example, when the cell enters the dormant state, an existing deactivation mechanism may still be used to notify the UE, so that the UE does not receive and detect the control channel or the service data within at least a period of time. In addition, the first signal may further be used to notify the UE that the cell enters the dormant state, so that the UE distinguishes the dormant state of the cell from an inactive state in the old mechanism. If an RRM measurement mechanism of the inactive state is different from that of the dormant state of the cell, in this case, the UE may execute a corresponding RRM measurement mechanism and the like according to a specific situation (for example, whether a current state is the inactive state of the current UE or the dormant state of the cell).

It should be noted that, the step 201 is implemented optionally, that is, the UE receives the first signal, and determines, according to the first signal, that the first cell enters the dormant state. That is, the UE may not receive the first signal, or in a situation in which the UE does not successfully receive the first signal, the UE may directly perform another step, for example, detect the second signal, and when the second signal is detected, determine, according to the second signal, that the first cell enters the active state from the dormant state. A specific implementation manner is not limited in this embodiment of the present disclosure.

202. The UE detects a second signal.

The second signal is any one or a combination of any two or more of the following signals: a PSS, an SSS, a CRS, and a CSI-RS.

Further, the second signal may further include signals carried by channels such as a PCFICH, a PDCCH, and an EPDCCH, or MAC dedicated signaling, RRC dedicated signaling, or the like.

In this embodiment of the present disclosure, to reduce complexity of detecting and processing the signal by the UE, the UE starts to detect the second signal after determining that the first cell enters the dormant state. Further, to further reduce complexity of detecting and processing the control channel (for example, the PDCCH/EPDCCH) and the service data (for example, the PDSCH) by the UE, after the UE determines that the first cell enters the dormant state, the UE stops processing such as detecting and receiving the control channel (for example, the PDCCH/EPDCCH) and/or detecting and receiving the service data (for example, the PDSCH).

Certainly, the UE may also continually detect the second signal, which includes detecting the second signal in a situation in which the first signal is not received, that is, it cannot be determined whether the first cell enters the dormant state. In this way, only the second signal needs to be detected, and when the second signal is detected, the UE determines, according to the second signal, that the first signal is in the active state at least in a subframe of the currently detected second signal or within a sending period of the second signal. In this way, a discontinuous transmission mechanism of the first cell can be flexibly enabled, and in particular, the discontinuous transmission mechanism can be dynamically executed at an ms level, which does not affect implementation of the solution in the present disclosure.

203. When the second signal is detected, the UE determines, according to the second signal, that the first cell enters an active state.

Specifically, when the UE detects the second signal, the UE assumes that the first cell is in the active state in both the current subframe and a subsequent subframe. Specifically, the first cell may be in the active state in both a current subframe in which the second signal is sent and a subframe included in the sending period of the second signal, or the first cell is in the active state in a subframe included in a period of time from the current subframe in which the second signal is sent to a moment when the UE detects the first signal, or the first cell is in the active state in a subframe included in a period of time (or within a period) pre-defined or configured by a system, which is not specifically limited herein.

When the UE detects the second signal, it is further implicitly determined that the dormant state of the first cell is terminated. Regardless of whether the dormant state of the first cell has arrived at a pre-agreed moment for terminating dormancy, the UE considers that the dormant state of the first cell is terminated and the first cell enters the active state of normal communication. If the UE does not detect the second signal at a moment when the second signal is possibly sent, the UE assumes that the first cell is still in the dormant state in the current subframe and some subsequent subframes, and the UE continues to detect whether the second signal exists in the first cell. Until the UE successfully detects the second signal, the UE always assumes that the first cell is in the dormant state, unless there is signaling for a terminating moment of the dormant state of the first cell and the moment for terminating the dormant state has arrived.

Optionally, sending and notifying of these signals may be performed in a cell-specific broadcast manner. In this way, when the first cell enters the active state from the dormant state, the base station sends the second signal to UEs in the first cell according to a preset sending manner of the second signal. All UEs in the first cell may acquire the information, thereby determining that the first cell enters the active state. In addition, sending and notifying of these signals may further be performed in a UE-specific unicast manner, and these signals may be the CSI-RS signal, or may be signals carried by channels such as the PDCCH and the EPDCCH, or MAC dedicated signaling, RRC dedicated signaling, or the like. Specifically, manners of sending and notifying of these signals may be similar to a UE-specific unicast manner (for example, the MAC signaling) of activating and deactivating a supplementary carrier in a multicarrier system. In this way, when the first cell enters the active state from the dormant state, the base station sends the second signal to specific UE in the first cell according to the preset sending manner of the second signal, and the specific UE in the first cell may acquire the information, thereby determining that the first cell enters the active state.

When the first cell enters the active state from the dormant state, the base station sends the second signal to the UE in the first cell according to the preset sending manner of the second signal, and when the second signal is detected, the UE further needs to acquire the sending manner of the second signal, and then determines, according to the sending manner of the second signal, that the first cell enters the active state, where the sending manner of the second signal includes one or two of a time-frequency resource location and a sending period that are of the second signal. It should be noted that, to use each signal in the foregoing several signals as the second signal or as a part of the second signal, a sending manner of the signal such as a time-frequency resource location and a sending period needs to be further determined, so as to be distinguished from a normally-sent signal. In particular, when these signals are also sent in a normal active state, effects of these signals need to be further clarified, so as to determine whether these signals are the second signal. Specifically, the base station may flexibly configure the sending period of the second signal by combining a delay of a transition of the first cell from the dormant state to the active state. It should further be noted that, if the second signal is a combination of multiple signals, detection of the second signal is considered as successful only when the UE detects all signals included in the second signal. Optionally, the sending manner of the second signal may be pre-defined by a system or may be pre-configured by means of configuration signaling, which is not limited herein.

Optionally, in this embodiment of the present disclosure, when determining that the first cell enters the dormant state, the UE stops detecting and receiving the service data in the first cell, and when determining that the first cell enters the active state from the dormant state, the UE starts to detect and receive the service data in the first cell. Further, when the UE determines that the first cell enters the active state from the dormant state, the UE further starts to detect and track normal synchronization of the first cell, detect and receive a broadcast channel and a system message, detect and measure a control channel, and the like.

It can be learned from the foregoing technical solution that in this embodiment of the present disclosure, a first signal is used to indicate, to UE, that a first cell enters a dormant state, and a second signal is used to indicate, to the UE, that the first cell enters an active state from the dormant state, so that the UE can sense a state of the first cell in time, and therefore, it is possible that the UE executes a corresponding processing mechanism in time with respect to a change in the state of the first cell. For example, when learning a state that the first cell enters, the UE stops detecting and receiving a service of the first cell in time or starts to detect and receive a service of the first cell in time, so that service transmission can be immediately started after the first cell enters the active state from the dormant state, which improves system performance and service efficiency of the cell.

Figure 3:
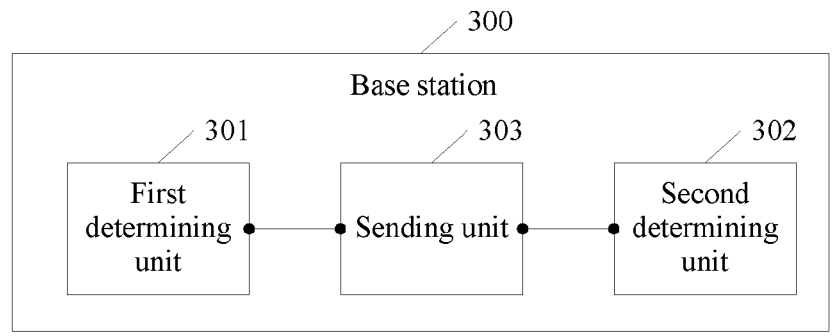
FIG. 3 is a schematic structural diagram of an embodiment of a base station according to the present disclosure.

An embodiment of the present disclosure further provides a base station. The following describes the base station provided in this embodiment of the present disclosure. Referring to FIG. 3, a base station 300 in this embodiment of the present disclosure includes: a first determining unit 301, a second determining unit 302, and a sending unit 303.

The first determining unit 301 is configured to determine that a first cell enters or prepares to enter a dormant state.

This embodiment of the present disclosure provides two mechanisms of the dormant state of the cell, that is, a cell dynamic discontinuous transmission mechanism and a semi-static cell dormancy mechanism. For the cell dynamic discontinuous transmission, as long as no fixed signal needs to be sent in a current subframe, it may be dynamically implemented, in the cell, that data and relevant control information of any UE are not scheduled. That is, when no fixed signal needs to be sent in the current subframe, the first determining unit 301 determines that the first cell may enter the dormant state. For the semi-static cell dormancy mechanism, the first determining unit 301 may determine, according to situations such as load and a transmission amount of a service in the first cell, and whether there is UE that needs to be served in a coverage area of the first cell, that the first cell enters the dormant state within a period of time.

The second determining unit 302 is configured to determine that the first cell enters an active state from the dormant state.

For the cell dynamic discontinuous transmission mechanism, when the first cell is in the dormant state, as long as a sent fixed signal exists in the current subframe, the second determining unit 302 may determine that the first cell enters the active state from the dormant state. For the semi-static cell dormancy mechanism, the second determining unit 302 may determine, according to the situations such as the load and the transmission amount of the service in the first cell, and whether there is UE that needs to be served in the coverage area of the first cell, that the first cell enters the active state from the dormant state.

The sending unit 303 is configured to: when the first determining unit 301 determines that the first cell enters or prepares to enter the dormant state, send a first signal to UE in the first cell, where the first signal carries information about time when the first cell enters the dormant state, so that the UE determines, according to the first signal, that the first cell enters the dormant state; and when the second determining unit 302 determines that the first cell enters the active state from the dormant state, send a second signal to the UE in the first cell, so that the UE determines, according to the second signal, that the first cell enters the active state.

In this embodiment of the present disclosure, the second signal is any one or a combination of any two or more of the following signals: a PSS, an SSS, a CRS, and a CSI-RS.

Further, the second signal may further include signals carried by channels such as a PCFICH, a PDCCH, and an EPDCCH, or MAC dedicated signaling, RRC dedicated signaling, or the like.

In an implementation manner, when the first cell enters or prepares to enter the dormant state, the sending unit 303 sends the first signal to the UE, where the first signal carries a start time point at which the first cell enters the dormant state, or by means of a protocol agreement, the UE considers that the first cell starts to enter the dormant state when the UE detects the first signal, thereby notifying the UE that the first cell starts to enter the dormant state from specific time. Then, the UE stops, within this period of time, receiving and detecting a control channel PDCCH/EPDCCH in the first cell, and/or stopping receiving service data in the first cell, and detects, receives, and measures, in a restricted manner, a signal that is possibly transmitted, for example, the DRS. Such a manner flexibly supports entry to the dormant state at any time.

In another implementation manner, at least one parameter of a time period of the dormant state is defined. The sending unit 303 sends the first signal to the UE when the first cell determines to enter or prepare to enter the dormant state, where the first signal carries at least one time period in which the first cell enters the dormant state, thereby notifying the UE that the dormant state of the first cell specifically starts from specific time and ends at specific time. The parameter of the time period may specifically indicate a situation of one period of the dormant state, a situation in which the dormant state occurs periodically for multiple times, or the like, which is not limited herein.

Optionally, the first signal is a discovery signal, for example, the DRS. In this embodiment of the present disclosure, the UE may learn, by detecting the first signal, that the cell in which the first signal is sent to the UE enters the dormant state; in addition, the discovery signal may further be used to support cell synchronization, cell discovery, and RRM measurement that are of the UE, where the discovery signal includes but is not limited to any one or a combination of any two or more of the following signals: a PSS, an SSS, a CRS, a CSI-RS, a PRS, and the like. When the first cell enters the dormant state, the base station sends the discovery signal to the UE in the first cell according to a preset sending manner of the discovery signal, where the sending manner of the discovery signal includes one or two of a time-frequency resource location and a sending period that are of the discovery signal. Optionally, the sending manner of the discovery signal may be pre-defined by a system or configured by means of configuration signaling, which is not limited herein.

It should be noted that, for a situation in which the discovery signal is a combination of multiple signals, different functions may be implemented by using different signal parts, for example, cell synchronization and discovery are implemented by using the PSS and/or the SSS, RRM measurement is performed by using the CRS or the CSI-RS, and that the cell enters the dormant state is indicated by using other network auxiliary information or by using the sending manner of the discovery signal, including the period and the time-frequency resource location. Specifically, for example, distinguishing is made by using a period or a frequency domain location of the PSS and/or the SSS. When an existing cell is in a normal communication state (that is, the active state), the PSS/SSS is transmitted in six central data blocks in entire system bandwidth in a period of 5 ms. When the PSS/SSS is transmitted in a location different from the six central data blocks in the entire system bandwidth or in another period, it may be considered that the cell enters the dormant state.

Optionally, the second signal is any one or a combination of any two or more of the following signals: a PSS, an SSS, a CRS, and a CSI-RS. Further, the second signal may also be the signals carried by the channels such as the PCFICH, the PDCCH, and the EPDCCH. When the first cell enters the active state from the dormant state, the base station sends the second signal to the UE in the first cell according to a preset sending manner of the second signal, where the sending manner of the second signal includes one or two of a time-frequency resource location and a sending period that are of the second signal.

It should be noted that, to use each signal in the foregoing several signals as the second signal or as a part of the second signal, a sending manner of the signal such as a time-frequency resource location and a sending period needs to be further determined, so as to be distinguished from a normally-sent signal. Specifically, the base station may flexibly configure the sending period of the second signal by combining a delay of a transition of the first cell from the dormant state to the active state. It should further be noted that, if the second signal is a combination of multiple signals, detection of the second signal is considered as successful only when the UE detects all signals included in the second signal. Optionally, the sending manner of the second signal may be pre-defined by a system or may be pre-configured by means of configuration signaling, which is not limited herein.

It should be noted that the base station in this embodiment of the present disclosure may be the base station in the foregoing method embodiment, and may be configured to implement all technical solutions in the foregoing method embodiment. Functions of each function module may be specifically implemented according to the method in the foregoing method embodiment. For a specific implementation process, refer to the related descriptions in the foregoing embodiment, and details are not described herein again.

It can be learned from the foregoing technical solution that in this embodiment of the present disclosure, a first signal is used to indicate, to UE, that a first cell enters a dormant state, and a second signal is used to indicate, to the UE, that the first cell enters an active state from the dormant state, so that the UE can sense a state of the first cell in time, and therefore, it is possible that the UE executes a corresponding processing mechanism in time with respect to a change in the state of the first cell. For example, when learning a state that the first cell enters, the UE stops detecting and receiving a service of the first cell in time or starts to detect and receive a service of the first cell in time, so that service transmission can be immediately started after the first cell enters the active state from the dormant state, which improves system performance and service efficiency of the cell.

Figure 4:
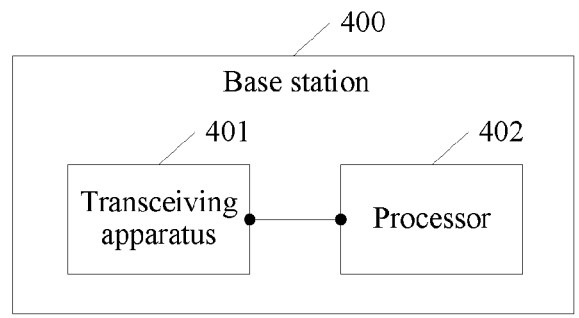
FIG. 4 is a schematic structural diagram of another embodiment of a base station according to the present disclosure.

An embodiment of the present disclosure further provides another base station. The following describes the base station provided in this embodiment of the present disclosure. Referring to FIG. 4, a base station 400 in this embodiment of the present disclosure includes: a transceiving apparatus 401 and a processor 402.

The processor 402 is configured to: when the base station 400 determines that a first cell enters or prepares to enter a dormant state, control the transceiving apparatus 401 to send a first signal to UE in the first cell, where the first signal carries information about time when the first cell enters the dormant state, so that the UE determines, according to the information about the time, that the first cell enters the dormant state; and when the first cell enters an active state from the dormant state, control the transceiving apparatus 401 to send a second signal to the UE in the first cell, so that the UE determines, according to the second signal, that the first cell enters the active state.

The second signal is any one or a combination of any two or more of the following signals: a PSS, an SSS, a CRS, and a CSI-RS.

Further, the second signal may further include signals carried by channels such as a PCFICH, a PDCCH, and an EPDCCH, or MAC dedicated signaling, RRC dedicated signaling, or the like.

In an implementation manner, when the processor 402 controls the transceiving apparatus 401 to send the first signal to the UE in the first cell, the first signal carries a start time point at which the first cell enters the dormant state, thereby notifying the UE that the first cell enters the dormant state from specific time; or by means of a protocol agreement, the UE considers that the first cell starts to enter the dormant state when the UE detects the first signal. Then, the UE stops, within this period of time, receiving and detecting the control channel PDCCH/EPDCCH in the first cell, and/or stopping receiving service data in the first cell, and detects, receives, and measures, in a restricted manner, a signal that is possibly transmitted, for example, the DRS. Such a manner flexibly supports entry to the dormant state at any time.

In another implementation manner, at least one parameter of a time period of the dormant state is defined. When the processor 402 controls the transceiving apparatus 401 to send the first signal to the UE in the first cell, the first signal carries at least one time period in which the first cell enters the dormant state, thereby notifying the UE that the dormant state of the first cell specifically starts from specific time and ends at specific time. The parameter of the time period may specifically indicate a situation of one period of the dormant state, a situation in which the dormant state occurs periodically for multiple times, or the like, which is not limited herein.

Optionally, the first signal is a discovery signal, for example, the DRS. In this embodiment of the present disclosure, the UE may learn, by detecting the first signal, that the cell in which the first signal is sent to the UE enters the dormant state; in addition, the discovery signal may further be used to support cell synchronization, cell discovery, and RRM measurement that are of the UE, where the discovery signal includes but is not limited to any one or a combination of any two or more of the following signals: a PSS, an SSS, a CRS, a CSI-RS, a PRS, and the like. When the first cell enters the dormant state, the base station sends the discovery signal to the UE in the first cell according to a preset sending manner of the discovery signal, where the sending manner of the discovery signal includes one or two of a time-frequency resource location and a sending period that are of the discovery signal. Optionally, the sending manner of the discovery signal may be pre-defined by a system or configured by means of configuration signaling, which is not limited herein.

It should be noted that, for a situation in which the discovery signal is a combination of multiple signals, different functions may be implemented by using different signal parts, for example, cell synchronization and discovery are implemented by using the PSS and/or the SSS, RRM measurement is performed by using the CRS or the CSI-RS, and that the cell enters the dormant state is indicated by using other network auxiliary information or by using the sending manner of the discovery signal, including the period and the time-frequency resource location. Specifically, for example, distinguishing is made by using a period or a frequency domain location of the PSS and/or the SSS. When an existing cell is in a normal communication state (that is, the active state), the PSS/SSS is transmitted in six central data blocks in entire system bandwidth in a period of 5 ms. When the PSS/SSS is transmitted in a location different from the six central data blocks in the entire system bandwidth or in another period, it may be considered that the cell enters the dormant state.

Optionally, when the first cell enters the active state from the dormant state, the base station sends the second signal to the UE in the first cell according to a preset sending manner of the second signal, where the sending manner of the second signal includes one or two of a time-frequency resource location and a sending period that are of the second signal.

It should be noted that, to use each signal in the foregoing several signals as the second signal or as a part of the second signal, a sending manner of the signal such as a time-frequency resource location and a sending period needs to be further determined, so as to be distinguished from a normally-sent signal. Specifically, the base station may flexibly configure the sending period of the second signal by combining a delay of a transition of the first cell from the dormant state to the active state. It should further be noted that, if the second signal is a combination of multiple signals, detection of the second signal is considered as successful only when the UE detects all signals included in the second signal. Optionally, the sending manner of the second signal may be pre-defined by a system or may be pre-configured by means of configuration signaling, which is not limited herein.

It should be noted that the base station in this embodiment of the present disclosure may be the base station in the foregoing method embodiment, and may be configured to implement all technical solutions in the foregoing method embodiment. Functions of each function module may be specifically implemented according to the method in the foregoing method embodiment. For a specific implementation process, refer to the related descriptions in the foregoing embodiment, and details are not described herein again.

It can be learned from the foregoing technical solution that in this embodiment of the present disclosure, a first signal is used to indicate, to UE, that a first cell enters a dormant state, and a second signal is used to indicate, to the UE, that the first cell enters an active state from the dormant state, so that the UE can sense a state of the first cell in time, and therefore, it is possible that the UE executes a corresponding processing mechanism in time with respect to a change in the state of the first cell. For example, when learning a state that the first cell enters, the UE stops detecting and receiving a service of the first cell in time or starts to detect and receive a service of the first cell in time, so that service transmission can be immediately started after the first cell enters the active state from the dormant state, which improves system performance and service efficiency of the cell.

Figure 5:
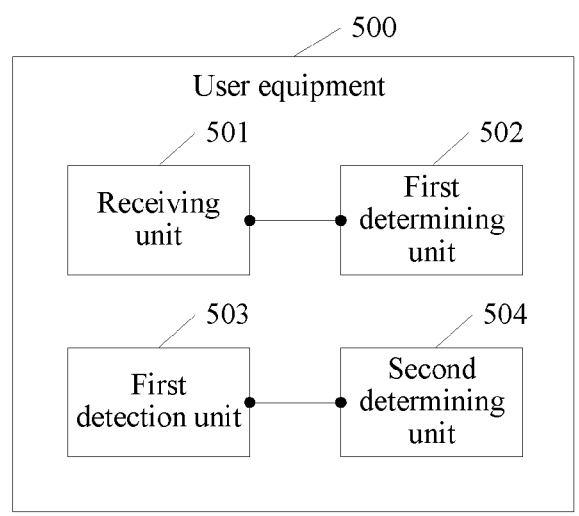
FIG. 5 is a schematic structural diagram of an embodiment of user equipment according to the present disclosure.

An embodiment of the present disclosure further provides another user equipment. The following describes the user equipment provided in this embodiment of the present disclosure. Referring to FIG. 5, user equipment 500 in this embodiment of the present disclosure includes:

a receiving unit 501, configured to receive a first signal, where the first signal carries information about time when the first cell enters a dormant state;

a first determining unit 502, configured to: when the receiving unit 501 receives the first signal, determine, according to the information about the time, that the first cell enters the dormant state;

a first detection unit 503, configured to detect a second signal; and a second determining unit 504, configured to: when the first detection unit 503 detects the second signal, determine, according to the second signal, that the first cell enters an active state, where:

the second signal is any one or a combination of any two or more of the following signals:

a PSS, an SSS, a CRS, and a CSI-RS.

Optionally, the first signal carries a start time point at which the first cell enters the dormant state; and the first determining unit 502 is further configured to determine, according to the first signal, that the first cell enters the dormant state from the start time point; or by means of a protocol agreement, when the receiving unit 501 receives the first signal, the first determining unit 502 determines that the first cell starts to enter the dormant state.

Optionally, the first signal carries at least one time period in which the first cell enters the dormant state; the first determining unit 502 is further configured to determine, according to the first signal, that the first cell is in the dormant state within the at least one time period.

Optionally, the first signal is a discovery signal, for example, the DRS. In this embodiment of the present disclosure, the user equipment 500 may learn, by detecting the first signal, that the cell in which the first signal is sent to the user equipment 500 enters the dormant state; in addition, the discovery signal may further be used to support cell synchronization, cell discovery, and RRM measurement that are of the UE, where the discovery signal includes but is not limited to any one or a combination of any two or more of the following signals: a PSS, an SSS, a CRS, a CSI-RS, a PRS, and the like. When the first cell enters the dormant state, the base station sends the discovery signal to the user equipment 500 according to a preset sending manner of the discovery signal, where the sending manner of the discovery signal includes one or two of a time-frequency resource location and a sending period that are of the discovery signal. Optionally, the sending manner of the discovery signal may be pre-defined by a system or configured by means of configuration signaling, which is not limited herein.

It should be noted that, for a situation in which the discovery signal is a combination of multiple signals, different functions may be implemented by using different signal parts, for example, cell synchronization and discovery are implemented by using the PSS and/or the SSS, RRM measurement is performed by using the CRS or the CSI-RS, and that the cell enters the dormant state is indicated by using other network auxiliary information or by using the sending manner of the discovery signal, including the period and the time-frequency resource location. Specifically, for example, distinguishing is made by using a period or a frequency domain location of the PSS and/or the SSS. When an existing cell is in a normal communication state (that is, the active state), the PSS/SSS is transmitted in six central data blocks in entire system bandwidth in a period of 5 ms. When the UE detects that the PSS/SSS is transmitted in a location different from the six central data blocks in the entire system bandwidth or in another period (different from the period of 5 ms), it may be considered that the cell enters the dormant state.

Optionally, sending and notifying of the second signal is performed in a cell-specific broadcast manner. In this way, when the first cell enters the active state from the dormant state, the base station sends the second signal to UEs in the first cell according to a preset sending manner of the second signal. All UEs in the first cell may acquire the information, thereby determining that the first cell enters the active state. In addition, sending and notifying of these signals may further be performed in a UE-specific unicast manner, and these signals may be the CSI-RS signal, or may be signals carried by channels such as the PDCCH and the EPDCCH, or MAC dedicated signaling, RRC dedicated signaling, or the like. Specifically, manners of sending and notifying of these signals may be similar to a UE-specific unicast manner (for example, the MAC signaling) of activating and deactivating a supplementary carrier in a multicarrier system. In this way, when the first cell enters the active state from the dormant state, the base station sends the second signal to specific UE in the first cell according to the preset sending manner of the second signal, and the specific UE in the first cell may acquire the information, thereby determining that the first cell enters the active state. Specifically, on the basis of the embodiment shown in FIG. 5, user equipment 600 shown in FIG. 6 further includes a second detection unit 505, configured to: when the first detection unit 503 detects the second signal, detect a sending manner of the second signal; the second determining unit 504 is specifically configured to determine, according to the sending manner that is of the second signal and detected by the second detection unit 505, that the first cell enters the active state, where the sending manner of the second signal includes one or two of a time-frequency resource location and a sending period that are of the second signal.

Optionally, on the basis of the user equipment shown in FIG. 5, the user equipment further includes:

a first service control unit, configured to: when the second determining unit 504 determines that the first cell enters the active state from the dormant state, start to detect and receive service data in the first cell.

Optionally, on the basis of the user equipment shown in FIG. 5, the user equipment further includes:

a second service control unit, configured to: when the first determining unit 502 determines that the first cell enters the dormant state, stop detecting and receiving service data in the first cell.

It should be noted that the user equipment in this embodiment of the present disclosure may be the user equipment in the foregoing method embodiment, and may be configured to implement all technical solutions in the foregoing method embodiment. Functions of each function module may be specifically implemented according to the method in the foregoing method embodiment. For a specific implementation process, refer to the related descriptions in the foregoing embodiment, and details are not described herein again.

It can be learned from the foregoing technical solution that in this embodiment of the present disclosure, a first signal is used to indicate, to UE, that a first cell enters a dormant state, and a second signal is used to indicate, to the UE, that the first cell enters an active state from the dormant state, so that the UE can sense a state of the first cell in time, and therefore, it is possible that the UE executes a corresponding processing mechanism in time with respect to a change in the state of the first cell. For example, when learning a state that the first cell enters, the UE stops detecting and receiving a service of the first cell in time or starts to detect and receive a service of the first cell in time, so that service transmission can be immediately started after the first cell enters the active state from the dormant state, which improves system performance and service efficiency of the cell.

Figure 7:
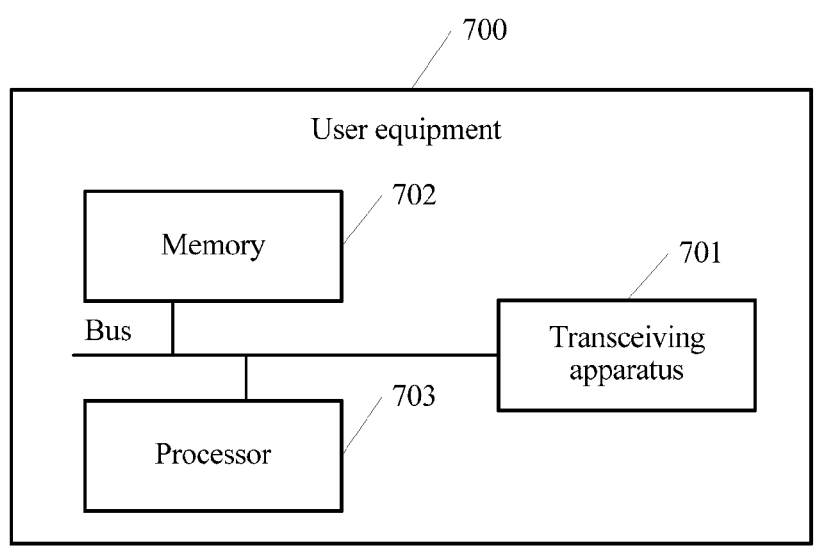
FIG. 7 is a schematic structural diagram of still another embodiment of user equipment according to the present disclosure.

The following describes another user equipment in an embodiment of the present disclosure. Referring to FIG. 7, user equipment 700 in this embodiment of the present disclosure includes:

a transceiving apparatus 701, a memory 702, and a processor 703 (a quantity of the processors 703 of the user equipment 700 may be one or more, and one processor is used as an example in FIG. 7). In some embodiments of the present disclosure, the transceiving apparatus 701, the memory 702, and the processor 703 may be connected by using a bus or in another manner, and that a connection is implemented by using a bus is used as an example in FIG. 7. The memory 702 is configured to store data input by the transceiving apparatus 701, and may further store information such as a necessary file for processing data by the processor 702; the transceiving apparatus 701 may include a port for communication between the user equipment 700 and another device, and may further include external output devices of the user equipment 700, for example, a display, a keyboard, a mouse, and a printer. In this embodiment, the port that is in the transceiving apparatus 701 and used for communication with another device may be an antenna.

The processor 703 performs the following steps: receiving a first signal, where the first signal carries information about time when the first cell enters a dormant state; determining, according to the information about the time, that the first cell enters the dormant state; detecting a second signal; and when the second signal is detected, determining, according to the second signal, that the first cell enters an active state from the dormant state.

In this embodiment of the present disclosure, the second signal is any one or a combination of any two or more of the following signals: a PSS, an SSS, a CRS, and a CSI-RS.

The first signal carries a start time point at which the first cell enters the dormant state. The processor 703 is further configured to: determine, according to the first signal, that the first cell enters the dormant state from the start time point; or by means of a protocol agreement, when the user equipment 700 receives the first signal, the processor 703 determines that the first cell enters the dormant state.

Optionally, the first signal carries at least one time period in which the first cell enters the dormant state; the processor 703 is further configured to determine, according to the first signal, that the first cell is in the dormant state within the at least one time period.

Optionally, the first signal is a discovery signal, for example, the DRS. In this embodiment of the present disclosure, the user equipment 700 may learn, by detecting the first signal, that the cell in which the first signal is sent to the user equipment 500 enters the dormant state; in addition, the discovery signal may further be used to support cell synchronization, cell discovery, and RRM measurement that are of the UE, where the discovery signal includes but is not limited to any one or a combination of any two or more of the following signals: a PSS, an SSS, a CRS, a CSI-RS, a PRS, and the like. When the first cell enters the dormant state, the base station sends the discovery signal to the user equipment 700 according to a preset sending manner of the discovery signal, where the sending manner of the discovery signal includes one or two of a time-frequency resource location and a sending period that are of the discovery signal. Optionally, the sending manner of the discovery signal may be pre-defined by a system or configured by means of configuration signaling, which is not limited herein.

It should be noted that, for a situation in which the discovery signal is a combination of multiple signals, different functions may be implemented by using different signal parts, for example, cell synchronization and discovery are implemented by using the PSS and/or the SSS, RRM measurement is performed by using the CRS or the CSI-RS, and that the cell enters the dormant state is indicated by using other network auxiliary information or by using the sending manner of the discovery signal, including the period and the time-frequency resource location. Specifically, for example, distinguishing is made by using a period or a frequency domain location of the PSS and/or the SSS. When an existing cell is in a normal communication state (that is, the active state), the PSS/SSS is transmitted in six central data blocks in entire system bandwidth in a period of 5 ms. When the UE detects that the PSS/SSS is transmitted in a location different from the six central data blocks in the entire system bandwidth or in another period (different from the period of 5 ms), it may be considered that the cell enters the dormant state.

Optionally, sending and notifying of the second signal is performed in a cell-specific broadcast manner. In this way, when the first cell enters the active state from the dormant state, the base station sends the second signal to UEs in the first cell according to a preset sending manner of the second signal. All UEs in the first cell may acquire the information, thereby determining that the first cell enters the active state. In addition, sending and notifying of these signals may further be performed in a UE-specific unicast manner, and these signals may be the CSI-RS signal, or may be signals carried by channels such as the PDCCH and the EPDCCH, or MAC dedicated signaling, RRC dedicated signaling, or the like. Specifically, manners of sending and notifying of these signals may be similar to a UE-specific unicast manner (for example, the MAC signaling) of activating and deactivating a supplementary carrier in a multicarrier system. In this way, when the first cell enters the active state from the dormant state, the base station sends the second signal to specific UE in the first cell according to the preset sending manner of the second signal, and the specific UE in the first cell may acquire the information, thereby determining that the first cell enters the active state. Specifically, the processor 703 is further configured to: when the second signal is detected, detect a sending manner of the second signal, and determine, according to the detected sending manner of the second signal, that the first cell enters the dormant state, where the sending manner of the second signal includes one or two of a time-frequency resource location and a sending period that are of the second signal.

It should be noted that the user equipment in this embodiment of the present disclosure may be the user equipment in the foregoing method embodiment, and may be configured to implement all technical solutions in the foregoing method embodiment. Functions of each function module may be specifically implemented according to the method in the foregoing method embodiment. For a specific implementation process, refer to the related descriptions in the foregoing embodiment, and details are not described herein again.

It can be learned from the foregoing technical solution that in this embodiment of the present disclosure, a first signal is used to indicate, to UE, that a first cell enters a dormant state, and a second signal is used to indicate, to the UE, that the first cell enters an active state from the dormant state, so that the UE can sense a state of the first cell in time, and therefore, it is possible that the UE executes a corresponding processing mechanism in time with respect to a change in the state of the first cell. For example, when learning a state that the first cell enters, the UE stops detecting and receiving a service of the first cell in time or starts to detect and receive a service of the first cell in time, so that service transmission can be immediately started after the first cell enters the active state from the dormant state, which improves system performance and service efficiency of the cell.

Figure 8:
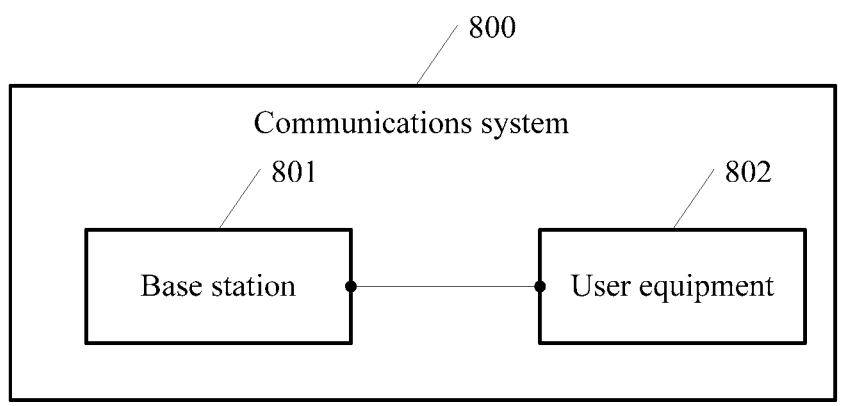
FIG. 8 is a schematic structural diagram of an embodiment of a communications system according to the present disclosure.

An embodiment of the present disclosure further provides a communications system. As shown in FIG. 8, the communications system includes at least one base station 801 and at least one user equipment 802 served by the base station 801.

The base station 801 may be any base station shown in FIG. 3 and FIG. 4.

Figure 6:
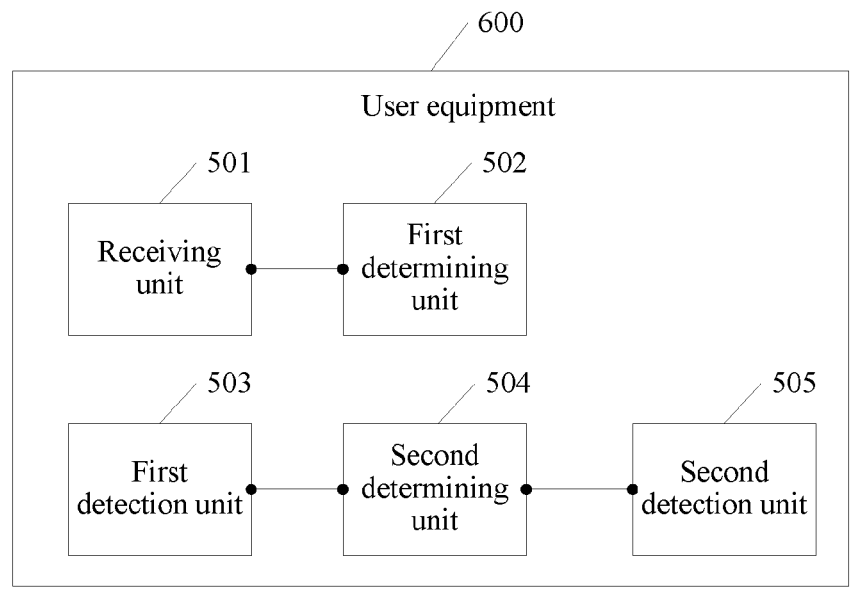
FIG. 6 is a schematic structural diagram of another embodiment of user equipment according to the present disclosure.

The user equipment 802 may be any user equipment shown in FIG. 5 to FIG. 7.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that the embodiments described in this specification all belong to exemplary embodiments, and the involved actions and modules are not necessarily mandatory to the present disclosure.

In the foregoing embodiments, the description of each embodiment has respective focuses. For a part that is not described in detail in an embodiment, reference may be made to related descriptions in other embodiments.

The foregoing describes in detail a signal sending method, a signal detection method, a relevant apparatus, and a system that are provided in the present disclosure. A person of ordinary skill in the art may, based on the idea of the present disclosure, make modifications with respect to the specific implementation manners and the application scope. In conclusion, the content of this specification shall not be construed as a limitation to the present disclosure.

What is claimed is:
1. A signal sending method, comprising:
in response to determining that a first cell enters or prepares to enter a dormant state, sending, by a base station, a first signal to a user equipment in the first cell, wherein the first signal carries information about a time that the first cell enters the dormant state, for determining, according to the information about the time, that the first cell enters the dormant state, wherein the first signal that carries the information about the time that the first cell enters the dormant state is carried in enhanced common search space (ECSS) of an Enhanced Physical Downlink Control Channel (EPDCCH), or is carried in a control format indicator (CFI) and sent in a physical control format indicator channel (PCFICH); and in response to determining that the first cell enters an active state from the dormant state, sending, by the base station, a second signal to the user equipment in the first cell, for determining, according to the second signal, that the first cell enters the active state, wherein the second signal is any one or a combination of any two or more of the following signals: a primary synchronization signal (PSS), a secondary synchronization signal (SSS), a cell-specific reference signal (CRS), and a channel state information-reference signal (CSI-RS).

2. The method according to claim 1, wherein the sending the first signal to the user equipment in the first cell comprises:

sending the first signal to the user equipment in the first cell, wherein the first signal carries a start time point at which the first cell enters the dormant state, for determining, according to the start time point at which the first cell enters the dormant state, that the first cell enters the dormant state at the start time point.

3. The method according to claim 1, wherein the sending the first signal to user equipment in the first cell comprises:

sending the first signal to the user equipment in the first cell, wherein the first signal carries at least one time period in which the first cell enters the dormant state, for determining, according to the at least one time period in which the first cell enters the dormant state, that the first cell is in the dormant state within the at least one time period.

4. The method according to claim 1, wherein the sending the first signal to the user equipment in the first cell comprises:

sending a discovery signal to the user equipment in the first cell according to a preset sending manner of the discovery signal, wherein the sending manner of the discovery signal comprises one or two of a time-frequency resource location and a sending period that are of the discovery signal.

5. The method according to claim 1, wherein the sending the second signal to the user equipment in the first cell comprises:

sending the second signal to the user equipment in the first cell according to a preset sending manner of the second signal, wherein the sending manner of the second signal comprises one or two of a time-frequency resource location and a sending period that are of the second signal.

6. A signal detection method, comprising:

receiving, by a user equipment, a first signal, wherein the first signal carries information about a time that the first cell enters a dormant state, wherein the first signal that carries the information about the time that the first cell enters the dormant state is carried in enhanced common search space (ECSS) of an Enhanced Physical Downlink Control Channel (EPDCCH), or is carried in a control format indicator (CFI) and sent in a physical control format indicator channel (PCFICH);

determining, by the user equipment according to the information about the time, that the first cell enters the dormant state;

detecting, by the user equipment, a second signal; and in response to the second signal being detected, determining, by the user equipment according to the second signal, that the first cell enters an active state, wherein the second signal is any one or a combination of any two or more of the following signals: a primary synchronization signal (PSS), a secondary synchronization signal (SSS), a cell-specific reference signal (CRS), and a channel state information-reference signal (CSI-RS).

7. The method according to claim 6, wherein the first signal carries a start time point at which the first cell enters the dormant state; and the determining, by the user equipment according to the first signal, that the first cell enters the dormant state comprises:

determining, by the user equipment according to the start time point at which the first cell enters the dormant state, that the first cell enters the dormant state at the start time point.

8. The method according to claim 6, wherein the first signal carries at least one time period in which the first cell enters the dormant state; and the determining, by the user equipment according to the first signal, that the first cell enters the dormant state comprises:

determining, by the user equipment according to the at least one time period in which the first cell enters the dormant state, that the first cell is in the dormant state within the at least one time period.

9. The method according to claim 6, wherein:

the receiving, by the user equipment, the first signal comprises receiving a discovery signal; and the determining, by the user equipment according to the first signal, that the first cell enters the dormant state comprises:

determining, by the user equipment according to a sending manner of the received discovery signal, that the first cell enters the active state, wherein the sending manner of the discovery signal comprises one or two of a time-frequency resource location and a sending period that are of the discovery signal.

10. The method according to claim 6, wherein the determining, by the user equipment according to the second signal, that the first cell enters an active state from the dormant state comprises:

detecting a sending manner of the second signal; and determining, by the user equipment according to the sending manner of the second signal, that the first cell enters the active state, wherein the sending manner of the second signal comprises one or two of a time-frequency resource location and a sending period that are of the second signal.

11. A base station, comprising:

a transceiving apparatus; and a processor configured to:

in response to the base station determining that a first cell enters or prepares to enter a dormant state, control the transceiving apparatus to send a first signal to a user equipment in the first cell, wherein the first signal carries information about a time that the first cell enters the dormant state, for determining, according to the information about the time, that the first cell enters the dormant state, and when the first cell enters an active state from the dormant state, control the transceiving apparatus to send a second signal to the user equipment in the first cell, for determining, according to the second signal, that the first cell enters the active state, wherein the first signal that carries the information about the time that the first cell enters the dormant state is carried in enhanced common search space (ECSS) of an Enhanced Physical Downlink Control Channel (EP- DCCH), or is carried in a control format indicator (CFI) and sent in a physical control format indicator channel (PCFICH), and wherein the second signal is any one or a combination of any two or more of the following signals: a primary synchronization signal (PSS), a secondary synchronization signal (SSS), a cell-specific reference signal (CRS), and a channel state information-reference signal (CSI-RS).

12. The base station according to claim 11, wherein the processor is further configured to send the first signal to the user equipment in the first cell, wherein the first signal carries a start time point at which the first cell enters the dormant state, for determining, according to the start time point at which the first cell enters the dormant state, that the first cell enters the dormant state at the start time point.

13. The base station according to claim 11, wherein the processor is further configured to send the first signal to the user equipment in the first cell, wherein the first signal carries at least one time period in which the first cell enters the dormant state, for determining, according to the at least one time period in which the first cell enters the dormant state, that the first cell is in the dormant state within the at least one time period.

14. The base station according to claim 11, wherein the processor is configured to send the first signal to the user equipment in the first cell in the following manner:

sending a discovery signal to the user equipment in the first cell according to a preset sending manner of the discovery signal, wherein the sending manner of the discovery signal comprises one or two of a time-frequency resource location and a sending period that are of the discovery signal.

15. The base station according to claim 11, wherein the processor is configured to send the second signal to the user equipment in the first cell in the following manner:

sending the second signal to the user equipment in the first cell according to a preset sending manner of the second signal, wherein the sending manner of the second signal comprises one or two of a time-frequency resource location and a sending period that are of the second signal.

16. A user equipment, comprising:
a transceiving apparatus; and
a processor, wherein:
the transceiving apparatus is configured to receive a first signal, wherein the first signal carries information about a time that the first cell enters a dormant state, wherein the first signal that carries the information about the time that the first cell enters the dormant state is carried in enhanced common search space (ECSS) of an Enhanced Physical Downlink Control Channel (EPDCCH), or is carried in a control format indicator (CFI) and sent in a physical control format indicator channel (PCFICH); and the processor is configured to: determine, according to the information about the time, that the first cell enters the dormant state, detect a second signal, and, when the second signal is detected, determine, according to the second signal, that the first cell enters an active state from the dormant state, wherein the second signal is any one or a combination of any two or more of the following signals: a primary synchronization signal (PSS), a secondary synchronization signal (SSS), a cell-specific reference signal (CRS), and a channel state information-reference signal (CSI-RS).

17. The user equipment according to claim 16, wherein:
the first signal carries a start time point at which the first cell enters the dormant state; and
the processor is further configured to determine, according to the start time point at which the first cell enters the dormant state, that the first cell enters the dormant state at the start time point.

18. The user equipment according to claim 16, wherein:
the first signal carries at least one time period in which the first cell enters the dormant state; and
the processor is further configured to determine, according to the at least one time period in which the first cell enters the dormant state, that the first cell is in the dormant state within the at least one time period.

19. The user equipment according to claim 16, wherein:
the first signal received by the transceiving apparatus is a discovery signal; and
the processor is configured to determine, according to a sending manner of the discovery signal received by the transceiving apparatus, that the first cell enters the active state, wherein the sending manner of the discovery signal comprises one or two of a time-frequency resource location and a sending period that are of the discovery signal.

20. The user equipment according to claim 16, wherein:
the processor is configured to: acquire a sending manner of the second signal, and determine, according to the sending manner of the second signal, that the first cell enters the active state, wherein the sending manner of the second signal comprises one or two of a time-frequency resource location and a sending period that are of the second signal.

* * * * *